United States Patent [19]

Greer

[11] 4,328,830

[45] May 11, 1982

[54] FLUID MIXING VALVE

[75] Inventor: Larry G. Greer, LaFayette, Ind.

[73] Assignee: Globe Valve Corporation, Delphi, Ind.

[21] Appl. No.: 115,424

[22] Filed: Jan. 25, 1980

[51] Int. Cl.³ ............................................. F16K 11/06
[52] U.S. Cl. ................................ 137/625.4; 137/636.4
[58] Field of Search ................ 137/625.17, 636, 636.1, 137/636.2, 636.3, 636.4, 607, 625.4, 625.48

[56] References Cited

U.S. PATENT DOCUMENTS

| | | | |
|---|---|---|---|
| 2,800,847 | 7/1957 | Bennett | 137/636.4 X |
| 3,415,280 | 12/1968 | Bucknell et al. | 137/625.17 |
| 3,788,354 | 1/1974 | Symmons | 137/625.4 |
| 3,828,821 | 8/1974 | Dotter | 137/636.4 |
| 3,933,165 | 1/1976 | Budzak et al. | 137/625.48 |
| 3,957,081 | 5/1976 | De Wavrin et al. | 137/625.4 |

FOREIGN PATENT DOCUMENTS

1336989 11/1973 United Kingdom ............. 137/636.4

Primary Examiner—William R. Cline
Attorney, Agent, or Firm—Dressler, Goldsmith, Shore, Sutker & Milnamow, Ltd.

[57] ABSTRACT

A three-way fluid mixing valve as provided with a valve body having a mixing chamber in communication with an outlet passage and two inlet passages, the two inlet passages opening into the chamber through opposed, axially aligned inlet ports. A cylindrical stem is guided by the valve body for angular movement about the stem axis and rectilinear movement along the axis and supports a cage in the mixing chamber. The cage has two spaced-apart planar valve members each defining an orifice therethrough disposed so as to be movable into and out of registration with one of the inlet ports in two mutually perpendicular directions in a plane of movement extending parallel to the associated inlet port. The cage is mounted on a stem for vertical movement with the stem and the stem has a camming shaft received in a cam follower slot in the cage for effecting reciprocating movement of the cage within the chamber when the stem is rotated by suitable handle means.

20 Claims, 12 Drawing Figures

FLUID MIXING VALVE

DESCRIPTION

1. Technical Field

The present invention relates to a three-way fluid mixing valve, such as that suitable for use in a single spout mixing tap or faucet, which makes it possible to adjust the flow rate of two liquid streams so that both the combined flow volume of the two streams can be varied and the flow rate of one stream relative to the other can be varied.

2. Background of the Invention

In residential and commercial plumbing installations, fluid mixing valves, such as those used in sink water faucets, are becoming increasingly popular. Such faucets typically have a single handle that controls the volume of both the hot and cold water passing through the faucet and that also controls the relative proportions of the hot and cold water. For kitchen sink installations, the single handle may include an outwardly projecting lever which can be easily manipulated with the wrist or forearm, as well as with the hand.

Many types of three-way mixing valve faucets have been designed over the years. Many of these faucets are relatively complex and require a number of springs, inserts, and separate subassemblies.

Despite the wide varieties of mixing faucets available today, most of these, at least in the United States of America, are operated by moving the faucet handle in a manner that has become a generally accepted convention. Specifically, when viewing a faucet installed on a sink from in front of the sink and from above the faucet, the handle is lifted up to turn the water on, is rotated counterclockwise to turn the cold water full on, and is rotated clockwise to turn the hot water full on.

When the handle is rotated to the midpoint or neutral position, relatively equal flow rates of hot and cold water are mixed. As the handle is rotated counterclockwise from the neutral position the relative flow of cold water increases and the relative flow of hot water decreases. Similarly, rotation of the handle in the clockwise direction increases the relative flow of hot water and decreases the relative flow of cold water that is mixed in the faucet.

It would be desirable to provide a mixing valve for use with a single handle faucet that has relatively few separate parts. Further, it would be beneficial if the parts for such a mixing valve had relatively simple shapes and were relatively inexpensive to manufacture.

Further, it would be an advantage to provide a mixing valve that could be easily assembled and easily mounted within a decorative faucet assembly. It would be beneficial if the mixing valve, or parts thereof, could be easily used in faucet assemblies of different decorative structures and sizes, such as those for a lavatory sink or those for a kitchen sink.

It would be helpful if a three-way mixing valve could be provided with a relatively small diameter and a relatively short length so that the overall faucet assembly could be made as compact as possible commensurate with providing the required flow rates.

With such a mixing valve unit, it would also be desirable if the unit could be entirely fabricated from thermoplastic materials to eliminate the expense of metal working and attendant oxidation and corrosion problems which are encountered with many metal materials.

It would be most helpful if a mixing valve having the features set forth above would also have a reversable valve cage structure that would permit the reversal of the hot and cold water valve connections and still be operable to provide hot and cold water, or a mixture thereof, according to the conventional handle movement.

With a mixing valve having the features described above, it would be also useful to provide the capability of easy assembly and disassembly, thus making repair and replacement of any parts easier.

These advantages are embodied in the invention described in this application.

SUMMARY OF THE INVENTION

A fluid mixing valve is provided for being actuated by a single handle that can be operated by rotating the handle and by raising and lowering the handle. The valve has a valve body defining therein a mixing chamber, an outlet passage communicating between the mixing chamber and the exterior of the valve body, and two inlet passages. Each inlet passage communicates with the exterior of the valve body and terminates at an inlet port to the mixing chamber. In the preferred embodiment, each inlet port is defined by a valve seat in a wall of the mixing chamber and has a circular cross section. The valve seats lie in spaced-apart parallel planes in the chamber walls and the inlet ports are aligned in opposed relation about a common axis.

A pair of spaced-apart planar valve members are disposed within the mixing chamber of the valve body. Each planar valve member is disposed against, and adapted to slide relative to, one of the valve seats in two mutually perpendicular directions in a plane of movement extending parallel to the seats. Each valve member has a flow contol means, such as an orifice, cooperable with one of the inlet ports, and movable into and out of registration with the associated inlet port in both of the mutually perpendicular directions. In the preferred embodiment, the planar valve member orifices are horizontally offset relative to each other but are in vertical alignment so that the movement of the valve members can vary the relative and combined volumes of flow of fluid through the inlet ports.

The planar valve members are preferably formed as part of a movable cage within the mixing chamber. The cage has side walls connecting the planar valve members and defining an elongated slot for receiving a shaft passing therethrough. The shaft is offset by a crank arm from a stem centrally disposed within the valve body and connected to the handle. Rotation of the stem causes the crank to move the shaft within the slot to thus effect a reciprocating movement of the cage within the mixing chamber.

The cage is suitably retained by the stem in the direction parallel to the longitudinal axis of the stem. Therefore, reciprocation of the stem along its longitudinal axis causes reciprocation of the cage in the same direction.

The planar valve members can thus move in two mutually perpendicular directions to control the flow of fluid into the mixing chamber without being rotated relative to the valve body inlet ports to provide for easy, reliable and consistent mixing flow and operation of the mixing valve.

Prior Art

The applicant is aware of various prior art patents that disclose mixing valves having certain structural elements which are in some respects similar to certain of the features incorporated in the unique valve of the present invention. However, the applicant is not aware of any prior art that teaches or suggests the invention disclosed and claimed herein.

The applicant is aware of United States patents that disclose mixing valves having a platelike valve member. For example, U.S. Pat. Nos. 2,877,797, 3,957,081, 3,533,444, and 3,828,821 each disclose a valve wherein the hot and cold water enters a mixing chamber through a single plate on one side of the valve body. However, these patents do not disclose, among other things, a valve in which the hot and cold water inlet ports have an opposed relationship as in the present invention.

U.S. Pat. No. 3,788,354 illustrates and describes a mixing valve in which the flow of water through inlet ports into a chamber is controlled by a pair of opposed, circular ceramic disks which each have a single rectangular hole located eccentric to the axis of disk curvature. The disks are progressively moved into and out of alignment with a corresponding inlet port so as to vary the relative volume flow of liquid from each of the ports into the chamber by means of a rather complicated, pivotally mounted control lever having a radially extending arm with a rounded head adapted to be slidably received in a bore of a mounting block that holds the two disks. Operation of the control lever causes each disk to be pivoted in a plane relative to the associated inlet port as well as to be translated in that plane parallel to the inlet port. This patent does not teach or suggest the novel structure of the present invention that includes, among other things, a novel valve member assembly in which each valve member is moved relative to an inlet port without being pivoted relative to the inlet port.

Various means for effecting movement of valve members have been developed over the years for use with single handle mixing valves and faucets. Among others, camming movements have been suggested and examples are disclosed in U.S. Pat. Nos. 1,293,003, 2,504,610, 2,452,295, and 2,054,346. The actuators in the valves disclosed in these patents reciprocate valve plugs in only one direction of movement into and out of engagement with an axially aligned valve seat. Thus, these patents do not teach or suggest the novel mechanism of the present invention wherein a mixing valve is provided with a camming actuator for moving a planar valve member relative to a valve seat but in a direction parallel to the plane of the aperture defined by the valve seat.

Camming actuators have been developed to convert rotary motion to reciprocating motion in valves, as shown by U.S. Pat. Nos. 2,017,317 and 2,008,623. However, the mechanisms disclosed in the above-described patents effect movement of the valve member in only one direction and do not suggest the novel three-way mixing valve structure of the present invention.

BRIEF DESCRIPTION OF THE DRAWINGS

In the accompanying drawings forming part of the specification, and in which like numerals are employed to designate like parts throughout the same.

Numerous other advantages and features of the present invention will become more readily apparent from the following detailed description of the invention and embodiments thereof, from the claims and from the accompanying drawings.

BRIEF DESCRIPTION OF THE PREFERRED EMBODIMENTS

While this invention is susceptible of embodiment in many different forms, there are shown in the drawings and will herein be described in detailed preferred embodiments of the invention. It should be understood, however, that the present disclosure is to be considered as an exemplification of the principles of the invention and is not intended to limit the invention to the embodiments illustrated.

The precise shapes and sizes of the components herein described are not essential to the invention unless otherwise indicated, since the invention is described with reference to illustrative embodiments thereof.

For ease of description, the mixing valve of this invention will be described in a normal operating position and terms such as upper, lower, horizontal, etc., will be used with reference to this position. It will be understood, however, that the valve of this invention may be manufactured, stored, transported, used, and sold in an orientation other than the position described.

The choice of materials is dependent upon the particular application involved and other variables, as those skilled in the art with appreciate.

Figures 1, 2, 3:
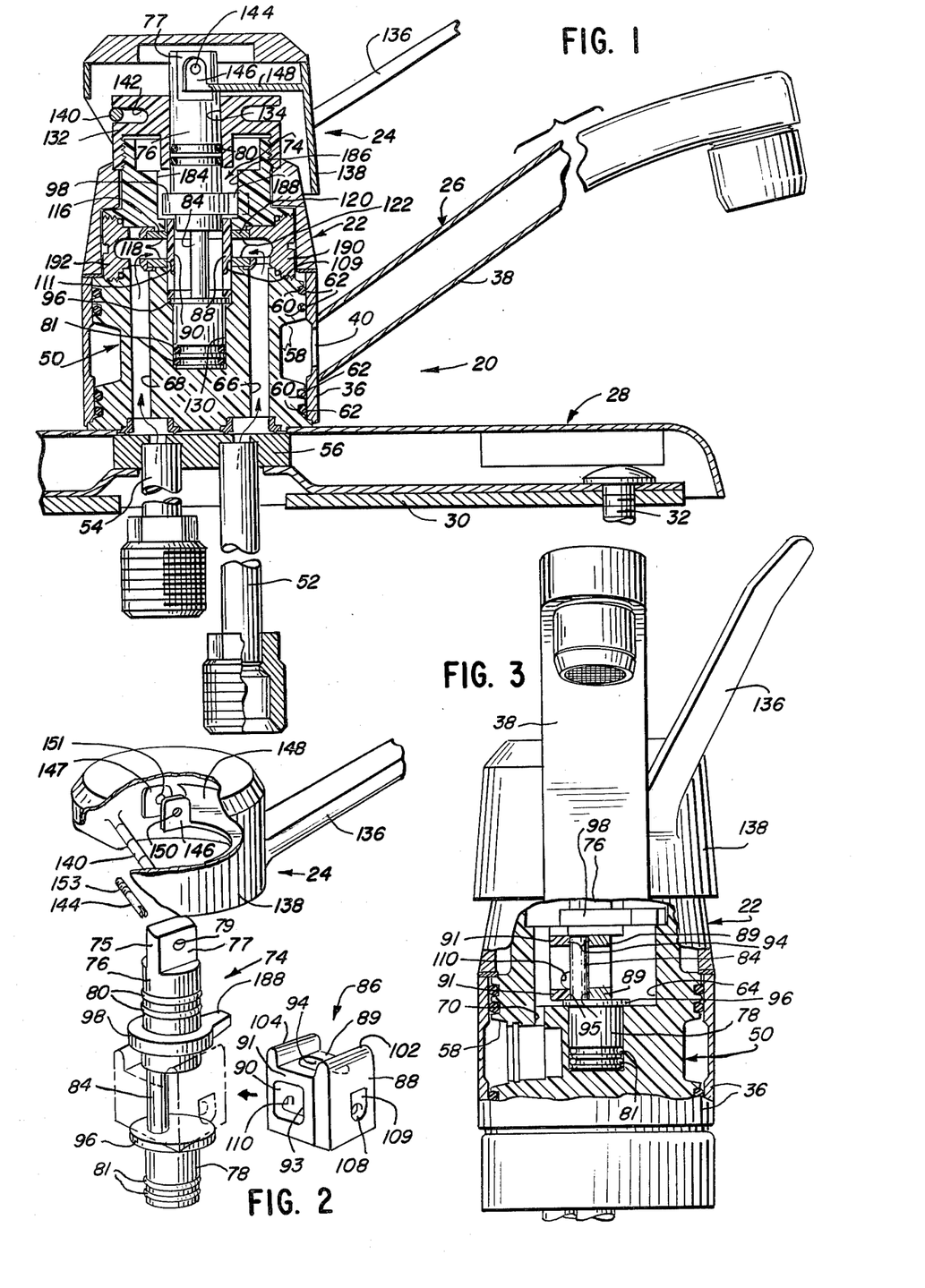
FIG. 1 is a fragmentary, cross-sectional elevational view of the back of a kitchen faucet embodying the three-way mixing valve of the present invention with the handle in the lowered, or "off" position and with the handle rotated toward the hot water flow position.
FIG. 2 is a fragmentary, partially exploded view of the faucet handle, stem, and cage of the faucet in FIG. 1 with a portion of the handle cut away to better illustrate the interior structure.
FIG. 3 is an end elevational view in partial cross section of the valve illustrated in FIG. 1.

A fluid mixing valve unit, as incorporated in a single lever-actuated faucet for a kitchen sink, is illustrated in FIG. 1 wherein the faucet is designated generally as numeral 20 and includes a decorative valve casing 22 which includes a handle 24, a spout assembly 26, and a base mounting assembly 28. The base 28 is of conventional design and is adapted to be secured to the top of a sink or other suitable mounting member 30 with suitable screws 32.

The spout assembly 26 includes a conventional, hollow cylindrical shell 36 and an outwardly extending faucet spout 38. The spout communicates with the inside of the shell 36 by means of an orifice 40 defined in the wall of the shell 36 at the region where the spout 38 is connected with the shell 36. The spout assembly 26 is rotatable relative to the base 28 so as to enable the spout 38 to be directed to various regions of the sink as desired.

Mounted within the decorative casing 22 is the valve body 50 which has a generally cylindrical configuration and which is provided with a variety of bores, passageways, and cavities as will be explained in detail hereinafter. The valve body 50 is mounted on the base plate 28 and is connected at the bottom through an apertured mounting block 56 to cold water inlet line 52 and hot water inlet line 54.

The exterior surface of the lower portion of the valve body 50 defines a circumferential channel or groove 58 aligned with the orifice 40 between the spout 38 and the inside of the shell 36. The groove 58 serves as a mixed water passageway for directing the flow of mixed water from the inside of the valve body to the spout 38. A plurality of smaller circumferential grooves 60 and cooperating O-rings 62 are provided above and below the groove 58 to function as sealing means for preventing outleakage of water from the groove 58.

As best illustrated in FIGS. 1 and 3, the valve body 50 has an interior mixing chamber 64 which has a generally rectangular cross section in both plan and elevation. The chamber 64 communicates with the cold water inlet line 52 through an inlet passage 66 and communicates with the hot water inlet line through an inlet passage 68. As clearly illustrated in FIG. 3, the mixing chamber 64 communicates with the exterior of the valve body 50 by means of passageway 70 which opens into the circumferential groove 58. Thus, hot and cold water entering the valve body through the passageways 66 and 68 can mix in the chamber 64 and then flow out through passageway 70 to groove 58 and into the spout 38 for final discharge from the faucet assembly.

Within the valve body is mounted a valve stem 74 which, as best illustrated in FIG. 2, has a generally solid cylindrical upper portion 76 and a generally cylindrical solid lower portion 78. The upper portion 76 is provided with a pair of O-rings 80 and the bottom portion 78 is provided with a pair of O-rings 81. The O-rings 80 and 81 function as sealing means between those portions of the stem 74 and the surrounding portions of the valve and also function somewhat as bearing members for accommodating the rotational and reciprocating movement of the stem that will be described in more detail hereinafter.

The stem upper portion 76 terminates in a connection member 75 which has a pair of opposed flat faces, only flat face 77 being visible in FIGS. 1 and 2. The connection member 75 defines a generally cylindrical bore 79 oriented with the longitudinal axis generally perpendicular to the flat face 77. The bore 79 functions to accommodate the connection mechanism between the stem 74 and the handle 24 as will be explained in more detail hereinafter.

Between the upper portion 76 and the lower portion 78 of the stem 74 is a crank structure which comprises a generally cylindrical, solid offset cam shaft 84 having a longitudinal axis parallel to, but displaced from, the common longitudinal axis of the stem upper and lower portions 76 and 78. Rotation of the stem 74 about the longitudinal axis will cause the cam shaft 84 to be carried in an orbit of revolution within the valve body 50.

As best illustrated in FIG. 2, a generally box-like cage 86 is mounted on the stem 74. The cage has a pair of opposed planar walls or valve members 88 and 90 which are joined by substantially planar, opposed side walls 89 and 91.

The cage 86 is preferably fabricated from a thermoplastic material from two pieces which are interfitted and suitably secured together to form the cage 86 in place around the shaft 84 of the stem 74. The two pieces defining the cage together form a generally hollow, apertured, right rectangular prism. One piece comprises the planar valve member 88 and the wall 89 joined at a right angle thereto. The other piece comprises the planar valve member 90 and the wall member 91 joined at a right angle thereto.

The wall members 89 and 91 are disposed generally parallel to each other and define between them upper slot 94 and lower slot 95 (FIGS. 2 and 3) for slidably receiving the shaft 84. The two pieces 88, 89 and 90, 91 forming the cage 86 may be identical and made in the same mold and may be interfitted with a snap connecting tongue and groove joint structure (not illustrated) and/or may be secured with suitable bonding agents or fasteners. The side walls 89 and 91 each have a relatively large aperture, such as rectangular aperture 93 in wall 91 (visible in FIG. 2), for permitting the water to flow out of the inside of the cage 86.

The cage 86 is retained on the stem 74 within the valve body mixing chamber 64 in a manner that prevents movement of the cage 86 vertically relative to the stem 74 but which permits horizontal reciprocatory movement relative to the stem 74. To this end, the lower portion 78 of the stem has an enlarged region or flange 96 on which the bottom of cage 86 rests and by which the cage 86 is retained against downward movement relative to the stem 74.

Similarly, the upper portion 76 of the stem has a flange 98 for bearing against the top of the cage 86. Preferably, as best illustrated in FIG. 2, the planar valve member walls 88 and 90 have upwardly extending portions 102 and 104, respectively, which are adapted to engage the underside of the flange 98 on the upper portion 76 of the stem 74.

The planar valve member 88 defines an orifice 108 extending therethrough and the planar valve member 90 defines an orifice 110 extending therethrough. These orifices are vertically aligned but are horizontally offset relative to each other. Orifice 108 is closer to side wall 89 than is orifice 110 and orifice 110 is closer to side wall 91 than is orifice 108.

The cage 86, and hence the planar valve members 88 and 90, are movable, as will be explained in detail hereinafter, so as to move the orifices 108 and 110, respectively, to block or open the inlet passages 66 and 68, respectively. To aid in this valving action, hollow cylindrical inserts 116 and 120 are provided in the valve body 50 to function as valve seats defining hot and cold water inlet ports 118 and 122, respectively, associated with the hot and cold water passages 68 and 66, respectively.

The sealing surfaces of the valve seats 116 and 120 lie in substantially parallel, spaced-apart planes and are adapted to sealingly contact the planar valve members 88 and 90. To insure a good sealing engagement, the valve seats 116 and 120 may be a somewhat resilient material and may project outwardly somewhat into the mixing chamber 64. The planar valve members 88 and 90 are spaced apart in parallel planes by an amount such that they are disposed against, and can slide relative to, the valve seats 116 and 120.

Preferably, the inlet ports 118 and 122 are located directly opposite each other in the mixing cavity 64 in both vertical and horizontal alignment even though the orifices 108 and 110 are vertically aligned, but horizontally or laterally offset from each other. Thus, when one orifice is in full horizontal registration with its associated inlet port, the other orifice is horizontally positioned away from the other inlet port, which other inlet port is then effectively closed.

The cage 86 can be moved vertically and horizontally within the mixing chamber 64 to move the valve member orifices 108 and 110 into and out of alignment or registration with their respective inlet ports 122 and 118 in either the vertical or horizontal directions to control the flow and relative proportions of hot and cold water through the faucet 20. To effect the proper movement of the cage 86, the valve stem 74 is rotated about its longitudinal axis and is vertically reciprocated within the valve body 50. To this end, the stem lower portion 78 is slidably received in a generally cylindrical lower cavity 130 and the stem upper portion 76 is slidably guided by a bracket member 132 which has a generally cylindrical bore 134 axially aligned with the longitudinal axis of the stem 74. The bracket 132 is threadingly mounted to the top of the valve body 50 and projects above the top of the decorative casing 22 of the faucet.

The stem 74 is rotated and vertically reciprocated within the valve body 50 by means of the handle 24 which has a lever 136 connected to a skirt or cowl portion 138. As best illustrated in FIG. 2, the cowl 138 has a hollow, substantially cylindrical configuration and carries a generally horizontally disposed fulcrum pin 140 displaced radially outwardly from the longitudinal axis of the stem 74 and forming a chord of the circle defined by the cylindrical cowl 138. The bearing bracket 132 is adapted to slidably receive the pin 140 and has, for this purpose, an inwardly extending, circumferential pin receiving groove 142.

The top of the stem 74 is connected to the cowl 138 by means of a fastening pin 144 which passes through the top of the stem 74. The pin 144 is received on either side of the stem 74 by upstanding brackets 146 and 147 that define pin receiving apertures 150 and 151, respectively, and that are carried by an inwardly projecting, horizontal support member 148. Aperture 151 in bracket 147 is threaded and pin 144 is threaded on one end at 153 so that the pin 144 may be threadingly retained in position in the brackets.

Since the pin 144 is mounted for rotation in bore 79 of the stem upper portion 76, movement of the handle lever 136 upwardly will cause the fulcrum pin 140 to bear downwardly against the bracket 132 in groove 142 so that the cowl 138 will pivot upwardly (with the pin 140 functioning as a fulcrum) to carry the stem 74 upwardly also. As the stem is raised, the pin 140 is necessarily urged radially inwardly within groove 142 towards the stem 74.

Movement of the handle lever 136 in a circular arc about the longitudinal axis of the stem 74 will cause the stem 74 to rotate about the longitudinal axis and to carry the pin 140 in an arc of a circle around the stem 74 within the pin receiving groove 142.

The handle 24 and cooperating bracket 132 illustrated in FIG. 1 are thus particularly well suited for permitting an operator to easily and quickly rotate or lift the handle lever 136 to effect the rotation of the stem 74 or the vertical reciprocation of the stem 74, respectively, as well as to effect a combination of both movements. However, other types of handle structures, such as a decorative structure for omitting lever 136, may be used to effect such rotational and vertical reciprocatory movement of the stem. The invention described herein is not in any way limited to the particular handle and bracket structure. It is sufficient that a handle means be provided for moving the stem 74 in the above-described manner.

The movement of the valve members 88 and 90 within the mixing chamber 64 will now be described in detail with reference to FIGS. 4 through 9. First, the control of the flow rate of the incoming hot and cold water will be described with reference to FIGS. 4 through 6.

Figures 4, 5:
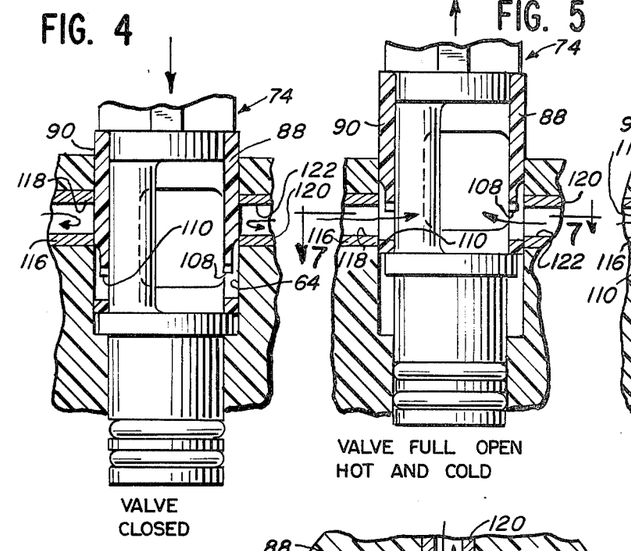
FIG. 4 is an enlarged, fragmentary, cross-sectional view of the mixing chamber of the valve of the present invention showing the valve in the fully closed position.
FIG. 5 is a view similar to FIG. 4 but showing the valve in the fully open position.

FIG. 4 shows the valve stem 74 oriented in the lowest position within the valve body 50. The planar valve members 88 and 90 are thus also at the lowest position within the mixing cavity 64 so that the orifices 108 and 110 are disposed below, and completely out of alignment with, the hot and cold inlet ports 118 and 122, respectively. In this orientation, the flow of hot and cold water is thus obviously blocked by the valve members 88 and 90 and no flow into the mixing chamber can take place. In this orientation the valve is closed and the faucet is conventionally described as being turned off.

In FIG. 5, the stem 74 is shown raised to the fullest extent possible. When the stem is in this position, further upward movement may be prevented by the top of the stem flange 98 (FIG. 1) abutting the bottom of the bearing bracket 132 or by the handle fulcrum pin 140 engaging the inner end of the groove 142 in the bracket 132. In any case, in that raised position, the orifices 108 and 110 are positioned to be substantially in full vertical registration with the respective hot and cold water inlet ports 118 and 122. In this orientation, the valve is fully open and the faucet is conventionally said to have been turned completely on.

Figure 6:
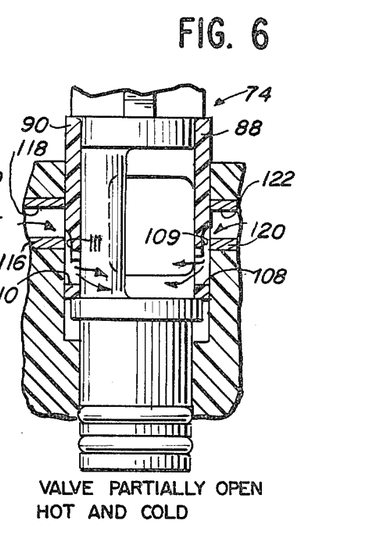
FIG. 6 is a view similar to FIG. 4 but showing the valve only partly open.

In FIG. 6, the stem 74 has been raised only partly towards the maximum raised position illustrated in FIG. 5 and the valve member orifices 108 and 110 are only in partial vertical registration with the hot and cold water inlet ports 118 and 122, respectively. In this position, the flow of hot and cold water into the mixing chamber 64 is less than the maximum rate achievable with the stem is in the position illustrated in FIG. 5. Movement of the stem 74 upwardly or downwardly increases or decreases, respectively, the flow rate of the hot and cold water as may be desired.

The hot and cold water flowing through the orifices 108 and 110, respectively, mix within the cage 86 and flow out of the cage 86 through the apertures in either sidewall, such as aperture 93 in sidewall 91 (FIG. 2). As best illustrated in FIG. 3, the sidewalls 89 and 91 are spaced away from the adjacent walls of the mixing cavity 64 to permit the flow of the mixed water out of the mixing chamber 64, through the passage 70, into the valve body groove 58 and from there out of the faucet spout 38.

Figure 7:
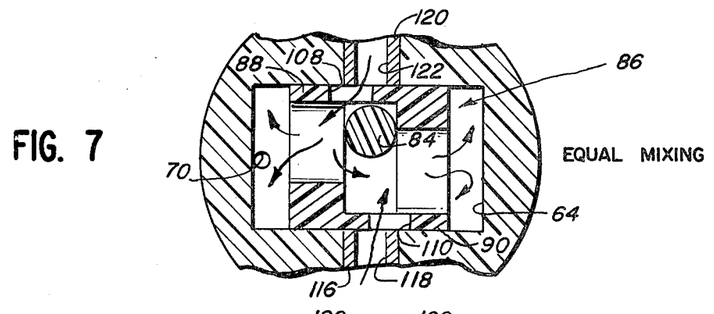
FIG. 7 is a fragmentary, cross-sectional view taken generally along the plane 7—7 in FIG. 5 and rotated 90 degrees, showing the valve fully open for providing generally equal flow rates of hot and cold water.
Figure 8:
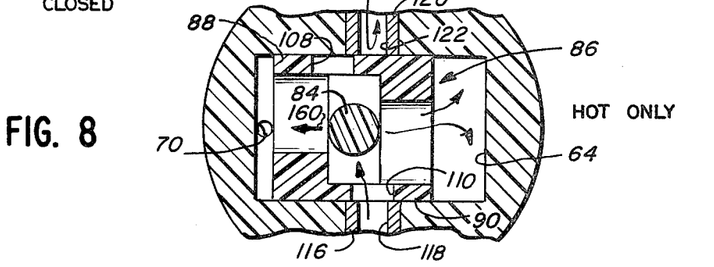
FIG. 8 is a view similar to FIG. 7 but with the valve positioned to provide hot water only.
Figure 9:
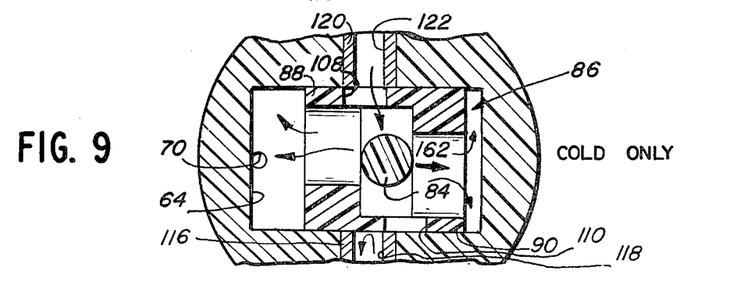
FIG. 9 is a view similar to FIG. 7 but with the valve positioned to provide cold water only.

FIGS. 7–9 illustrate the manner in which the relative proportions of hot and cold water are varied by the novel cage structure of the present invention.

FIG. 7 illustrates the "midpoint" position of the cage 86 when it is oriented in the mixing cavity 64 so as to provide equal mixing of both hot and cold water. In this orientation, a portion of the cold water orifice 108 in valve member 88 is in horizontal registry with the cold water inlet port 122 and a portion of the hot water orifice 110 in valve member 90 is in horizontal registry with the hot water inlet port 118 so that both hot and cold water flow into the interior of the cage where mixing occurs. From there, the mixed water flows out of the cage, guided by the walls of the mixing chamber 64, and then through the outlet passage 70 and to the spout.

Rotation of the stem 74 in one direction by the faucet handle will cause the camming shaft 84 to move in a circular arc to the left and away from orifice 108 to the position illustrated in FIG. 8. FIG. 8 also shows the cage 86 at the left end of the mixing chamber 64 so that the valve orifice 110 is fully aligned, in the horizontal direction, with the hot water inlet port 118. The flow of cold water from inlet port 122 is blocked by the valve member 88 since the orifice 108 is completely out of registration with the inlet port 122.

The cage 86 moves to the position illustrated in FIG. 8 because the shaft 84 slides within the slots defined in the top and bottom of the cage 86 and exerts a force on the cage in the direction of arrow 160.

Rotation of the stem 74 by the faucet handle in the opposite direction causes the shaft 84 to move in a circular arc back through the mixing position of FIG. 7 and then to the right to the position shown in FIG. 9. The shaft 84 urges cage 86 in the direction of arrow 162 to assume the position within the mixing chamber 64 wherein the hot water inlet port 118 is completely blocked by the planar valve member 90 and wherein the orifice 108 in the planar valve member 88 is in registration with the cold water inlet port 122. In this orientation, the cage 86 permits only cold water to flow through the valve.

The stem 74 need only be rotated less than 180 degrees in order to move the cage from the "hot water only" position illustrated in FIG. 8 to the "cold water only" position illustrated in FIG. 9. Consequently, a stopping means is provided within the valve to prevent turning of the valve by means of handle 24 beyond that amount which is necessary to move the cage between the two extreme positions illustrated in FIGS. 8 and 9. Specifically, the body 50 has lugs 184 and 186 (FIG. 1) above the mixing chamber 64 which project inwardly toward the stem upper flange 98. The lugs 184 and 186 are disposed opposite each other 180 degrees apart.

A stop member 188 projects outwardly from the flange 98 and is adapted to abut the lug 186 when the handle 24 is rotated a design maximum in one direction and is adapted to abut the lug 184 when the handle 24 is rotated a design maximum in the opposite direction. This prevents the rotation of the stem 74 beyond the points where the cage 86 is in the extreme positions illustrated in FIGS. 8 and 9.

The embodiment of the faucet illustrated in FIGS. 1-9 can be easily partially disassembled for permitting a rapid reversal of the stem 74 so as to reverse the action of the valve with respect to controlling the relative proportions of hot and cold water. This is useful in certain circumstances. For example, normally assume the faucet would be mounted on a sink and connected as shown in FIG. 1 with the cold water entering through conduit 52 and with the hot water entering through conduit 54. Movement of the handle 136 counterclockwise, as viewed looking down on the faucet, permits the cold water to be discharged with the hot water shut off. Movement of the handle 136 to the left permits the hot water to be discharged with the cold water shut off. This is the conventional handle movement. Now assume that the hot and cold water conduits 54 and 52, respectively, had been hooked up in the reverse fashion, that is, conduit 54 connected in place of conduit 52, and conduit 52 connected in place of conduit 54. In that situation the hot water flow would increase when the handle is turned counterclockwise and the cold water flow would increase when the handle is turned clockwise. To correct the situation without disconnecting and properly reconnecting the conduits 52 and 54, all one need do is to remove the stem 74 (with cage 86 carried thereon) from the body 50, rotate the stem 180 degrees, and replace the stem in the body 50 with the stop member 188 on the other side of the body lugs 184 and 186. This reverses the position of the cage valve members 88 and 90 so that the offset valve member orifices 108 and 110 then cooperate with the inlet ports 118 and 122, respectively, to provide the hot water according to the conventional lever rotation—counterclockwise for cold water and clockwise for hot water.

To provide a more sensitive flow control, the valve members 88 and 90 preferably define the orifices as generally cylindrical bores and also have an upwardly extending recess, such as recess 109 illustrated for orifice 108 in FIG. 2, which increases in depth from the surface of the planar member in the direction toward the bore portion of the orifice. In FIG. 1, the recess 109 is shown in cross section, as is a recess 111 associated with orifice 110.

To permit access to the inlet ports 122 and 118, threaded removable caps 190 and 192 may be provided in the body in axial alignment with the inlet ports 122 and 118, respectively.

Additional features may be provided within the valve body 50. For example, a conduit from the discharge passage 70 may be provided for connection to a conventional spray nozzle assembly (not illustrated). Though not illustrated, a suitable conventional diverter valve and anti-siphon valve may be incorporated to control the operation of the spray nozzle and may be mounted within the body 50.

It is to be noted that the handle assembly lever 136 is raised to increase flow through the valve. If desired, the operation could be reversed by modifying the valve structure. Specifically, the handle fulcrum pin 140 could be moved 180 degrees in the receiving groove 142 and positioned between the stem 74 and lever 136. This would cause the stem 74 to be lowered when the lever 136 is raised, and vice versa. If this were done, the cage 86 would have to be mounted on the stem 74 with the valve member orifices above, out of registration with, the inlet ports when the handle lever was down (the stem being then raised in the "off" position). Upon raising the lever to lower the stem and cage, the valve member orifices would be moved down into registry with the inlet ports to permit flow through the valve.

Figure 10:
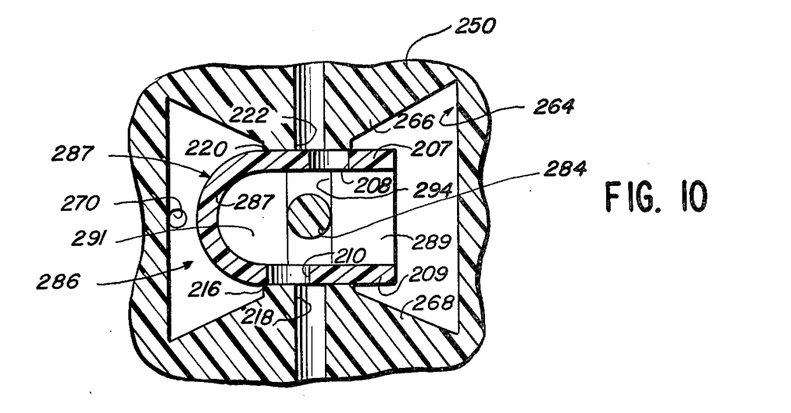
FIG. 10 is a simplified view similar to FIG. 7, but of a second embodiment of the valve according to the present invention.

FIG. 10 is a simplified cross-sectional illustration of a portion of a second embodiment of the mixing valve of the present invention. The valve includes a valve body 250 defining a mixing chamber 264 therein. The valve body 250 is generally similar to the valve body 50 illustrated for the first embodiment in FIGS. 1-9 with an obvious difference being the cross-sectional shape of the chamber 264.

As can be seen in FIG. 10, the cavity 264 of the second embodiment has a pair of opposed inwardly projecting wall portions 266 and 268 which present opposed, spaced-apart, parallel valve seats 220 and 216, respectively. The valve seat 216 defines a hot water inlet port 218 and the valve seat 220 defines a cold water inlet port 222. A discharge passage 270 leads from the chamber 264 to the faucet spout (not shown).

Disposed within the mixing chamber 264 is a cage 286. The cage 286 has a generally U-shaped member 287 with opposing side walls 207 and 209 each defining therein a cold water orifice 208 and a hot water orifice 210, respectively. A pair of cross walls 291 and 289 define a cam follower slot 294 in which is received a cam shaft 284 of a stem which is not visible but which is similar to the stem 74 illustrated for the first embodiment in FIGS. 1–3. Rotation of the stem about its longitudinal axis causes the cam shaft 284 to move in a circular arc within the follower slot 294 to impart a reciprocating motion to the cage 286 between two extreme positions within the cavity 264. In this manner, either orifice 208 or 210 may be aligned with the respective inlet port 222 and 218, respectively.

As with the first embodiment, the cage orifices 208 and 210 are horizontally offset relative to each other so that one of the orifices is moved completely out of alignment with its respective inlet port when the other orifice is moved into full alignment with its respective inlet port. The sizes of the inlet ports and of the cage orifices are suitably chosen so that between the two extreme cage positions there is a continuous range of intermediate positions wherein each cage orifice 208 and 210 can be in partial registration with the respective inlet port to provide for relative mixing of the hot and cold water flowing through the inlet ports.

Figure 11:
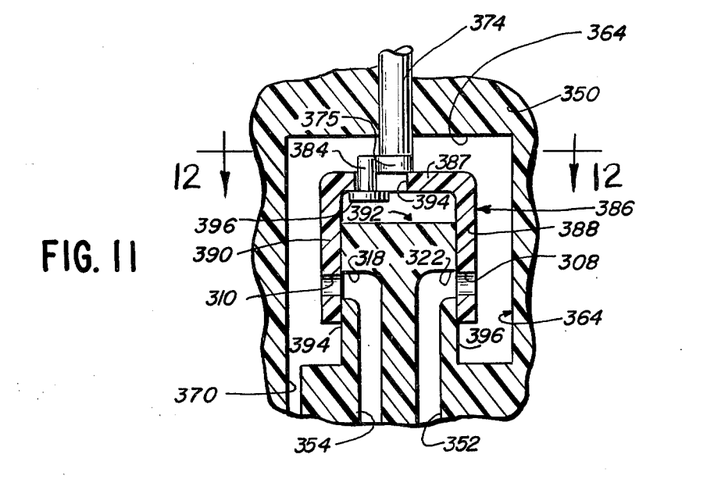
FIG. 11 is a view similar to FIG. 5 but of a third embodiment of a valve of the present invention.
Figure 12:
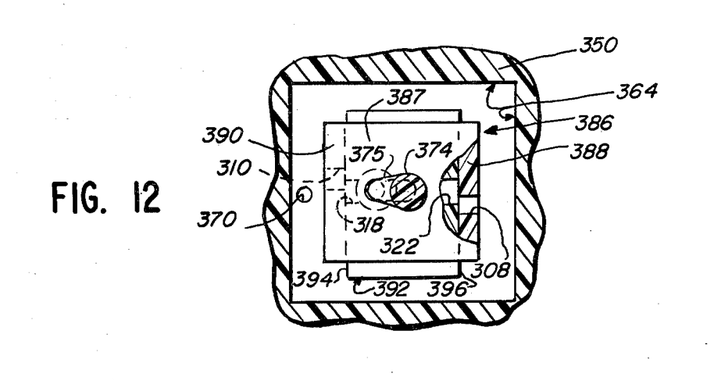
FIG. 12 is a cross-sectional view taken generally along the plane 12—12 in FIG. 11.

FIGS. 11 and 12 illustrate a portion of a further embodiment of the valve of the present invention wherein the valve body is designated generally by numeral 350 and wherein the valve body defines therein a mixing cavity 364 in which is received a cage 386.

The valve body 350 also defines an outlet passageway 370 communicating between the mixing chamber 364 and a suitable circumferential groove (not illustrated) and ultimately with the faucet spout in a manner similar to that illustrated and described with respect to the first embodiment illustrated in FIGS. 1–9.

The cage 386 comprises a top wall 387 with two integrally formed, opposed, parallel side walls 388 and 390 which form a generally U-shaped configuration. The cage 386 is adapted to be slidably engaged with a central post 392 which projects upwardly into the mixing chamber 364 and defines therein a cold water passageway 352 and a hot water passageway 354. The cold water passageway 352 communicates with the mixing chamber 364 via a cold water inlet port 322 and the hot water passageway 354 communicates with the mixing chamber 364 via a hot water inlet port 318. The inlet ports 318 and 322 are defined within the central post 392 in opposed, generally parallel, planar surfaces 394 and 396, respectively.

The cage sidewalls 388 and 390 are slidably engaged with the central post walls 394 and 396, respectively, and are adapted to be vertically and horizontally reciprocated to block or open the inlet ports 318 and 322. To this end, wall 388 defines therein an orifice 308 and wall 390 defines therein an orifice 310. The orifices 310 and 308 are adapted to be aligned in registration with the hot and cold water inlet ports 318 and 322, respectively, to permit the discharge of water therethrough.

The cage 386 is moved both horizontally and vertically relative to the central post 394 by a generally cylindrical stem 374 which is guided by the valve body 350 for angular movement about the stem axis and for rectilinear movement along the axis. The stem 374 has a crank arm 375 with an offset camming shaft 384.

The cage 386 is adapted to receive the camming shaft 384 and, to this end, is provided with an elongated cam follower slot 394 in the top horizontal wall 387. A flange 396 is provided at the distal end of the camming shaft 384 for retaining the cage 386 against the underside of the crank arm 375. In this manner the cage 386 is vertically restrained relative to the stem 374.

Rotation of the stem 374 by a handle (not illustrated) causes the camming shaft 384 to move in a circular arc about the longitudinal axis of the stem 374 and to cause the cage 386 to reciprocate in a direction generally perpendicular to the length of the slot 394. In this manner the cage orifices 308 and 310 can be moved horizontally from positions of full registration with their respective inlet ports to positions completely out of alignment with their respective inlet ports. Owing to the fact that the orifices 308 and 310 are laterally displaced or offset from each other, when one of the orifices is in full registration with its respective inlet port, the other orifice is completely out of alignment with its respective inlet port. At intermediate positions, the two cage orifices communicate with their respective inlet ports to provide a mixing flow.

Vertical movement of the stem, by means of a suitable handle mechanism (not illustrated), causes the cage 386 to move vertically. In this manner, the cage orifices 308 and 310 can be displaced entirely below the respective inlet ports to block all flow through the valve. Similarly, the cage can be raised to progressively increase the flow rates of the hot and cold water through the valve.

The three illustrated embodiments of the present invention feature hollow cylindrical hot and cold water body inlet ports which are axially aligned and feature planar valve members in which valve orifices are laterally displaced from each other. It is to be realized that, alternatively, the valve body inlet ports could be laterally displaced and the valve member orifices aligned on a common axis.

Also, it should be realized that the valve body inlet ports do not necessarily have to be circular in cross section but may be other shapes. Similarly, the shape and location of the valve member orifices may be different than that illustrated in the figures. It is only necessary that the shape and location of the valve member orifices and body inlet ports be such that movement of the valve members in one direction will simultaneously bring one valve member orifice into maximum registration with its associated inlet port and the other valve member orifice into a minimum registration with its associated inlet port.

In the illustrated embodiments of the valve of the present invention, it is to be noted that the valve member orifices are vertically aligned and horizontally offset. With this arrangement, vertical movement of the valve members within the mixing chamber effects a change in the flow rate of both the hot and cold water together while the horizontal displacement of the valve members within the mixing chamber effects a change in the relative proportions of hot and cold water flowing into the mixing chamber.

It is to be realized that, alternatively, the hot and cold water inlet ports could be horizontally aligned and vertically offset in the valve body and that the valve member orifices could be aligned on a common axis. With that type of structure, the horizontal movement of the valve members within the mixing chamber would progressively increase or decrease the flow of both hot and cold water together while the vertical movement of the valve members within the mixing chamber would effect a change in the relative proportion of hot and cold water flowing into the mixing chamber.

As another alternative, the valve member orifices could be horizontally aligned and vertically offset with the valve body inlet ports aligned on a common axis. Then, movement of the valve members in the vertical direction would also effect a change in the relative proportions of hot and cold water flowing into the mixing chamber and while movement of the valve members in the horizontal direction would serve to vary the combined volume of flow of hot and cold water through the valve.

From the foregoing, it will be observed that numerous variations and modifications may be effected without departing from the true spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A fluid mixing valve adapted to be actuated by a handle, said valve comprising:
   a valve body, said valve body defining therein (a) a mixing chamber, (b) an outlet passage communicating between said mixing chamber and the exterior or said valve body, (c) two inlet passages, each inlet passage communicating with the exterior of said valve body, and (d) a pair of valve seats spaced apart in parallel planes, each seat defining an inlet port to said mixing chamber for one of said inlet passages;
   a pair of spaced-apart valve members, each valve member disposed against and adapted to slide relative to one of said seats in two mutually perpendicular directions in a plane of movement extending parallel to said seats, each valve member defining an orifice therethrough disposed so as to be movable into and out of registration with one of said inlet ports in both of said mutually perpendicular directions;
   at least one of said valve member orifices or one of said inlet ports being offset in one of said mutually perpendicular directions so that when one valve member orifice and one inlet port are in maximum registration' the other valve member orifice and the other inlet port are in minimum registration; and
   means actuatable by a handle for restraining said valve members against pivoting movement in said mixing chamber relative to said seats and for moving said valve members together in said two mutually perpendicular directions.

2. The fluid mixing valve in accordance with claim 1 in which one of said pairs of valve member orifices and said inlet ports are offset relative to a plane perpendicular to said movement plane and in which the other pair is aligned in said perpendicular plane.

3. The fluid mixing valve in accordance with claim 1 further including a pair of substantially parallel planar walls and in which said valve seats are disposed in said planar walls.

4. The fluid mixing valve in accordance with claim 3 in which said pair of parallel planar walls are spaced apart and define opposite side portions of said mixing chamber.

5. The fluid mixing valve in accordance with claim 1 in which each said valve member includes a plate portion and in which each said orifice is defined in said plate portion.

6. A fluid mixing valve adapted to be actuated by a handle, said valve comprising:
   a valve body, said valve body defining therein (a) a mixing chamber, (b) an outlet passage communicating between said mixing chamber and the exterior of said valve body, (c) two inlet passages, each inlet passage communicating with the exterior of said valve body, and (d) a pair of substantially parallel valve seats in said mixing chamber, each seat defining therein an inlet port, each inlet port communicating between said mixing chamber and one of said inlet passages;
   a movable cage in said mixing chamber, said cage including a pair of spaced-apart valve members, each valve member disposed against and adapted to slide relative to one of said seats in two mutually perpendicular directions in a plane of movement extending parallel to said walls, each valve member defining an orifice therethrough disposed so as to be movable into and out of registration with one of said inlet ports in both of said mutually perpendicular directions, said cage defining at least one cam follower slot extending generally perpendicular to said planar walls;
   a generally cylindrical stem guided by the valve body for angular movement about the stem axis and for rectilinear movement along said axis, said stem supporting said cage in said mixing chamber and having a camming shaft being received in said cam follower slot;
   one of said pairs of valve member orifices and said inlet ports aligned in a plane perpendicular to said movement plane and the other pair being offset relative to said perpendicular plane so that when one valve member orifice and one inlet port are in maximum registration, the other valve member orifice and the other inlet port are in minimum registration; and
   handle means for moving said stem angularly and axially for thereby camming said cage in one of said perpendicular directions and moving said cage in the other of said perpendicular directions, respectively.

7. The fluid mixing valve in accordance with claim 6 in which said cage has a two-piece construction, each of said two pieces being secured together to form a generally hollow, apertured, right rectangular prism.

8. The fluid mixing valve in accordance with claim 6 in which said inlet ports are axially aligned about a common axis in spaced apart relationship on opposite sides of said mixing chamber.

9. A fluid mixing valve adapted to be actuated by a handle, said valve comprising:

a valve body, said valve body defining therein (a) a mixing chamber, (b) an outlet passage communicating between said mixing chamber and the exterior of said valve body, (c) two inlet passages, each inlet passage communicating with the exterior of said valve body, and (d) a pair of valve seats spaced apart in parallel planes, each seat defining an inlet port to said mixing chamber for one of said inlet passages;

a pair of spaced-apart valve members, each valve member disposed against and adapted to slide relative to one of said seats in two mutually perpendicular directions in a plane of movement extending parallel to said seats, each valve member having flow control means cooperable with one of said inlet ports and movable into and out of registration with one of said inlet ports in both of said mutually perpendicular directions' said movement of both said valve members thus varying the relative and combined volumes of flow fluid through said inlet ports; and means actuatable by a handle for restraining said valve members against pivoting movement in said mixing chamber relative to said inlet ports and for moving said valve members together in said two mutually perpendicular directions.

10. The fluid mixing valve in accordance with claim 9 in which said flow control means includes an orifice defined in each said valve member.

11. The fluid mixing valve in accordance with claim 10 in which said valve body has oppositely disposed wall portions projecting inwardly into said mixing chamber and in which said valve seats are provided in said oppositely disposed portions of said valve body.

12. The fluid mixing valve in accordance with claim 11 in which said valve includes a generally U-shaped cage member with a pair of opposing side walls adapted to slide within said mixing chamber and in which each said valve member is one of said side walls.

13. The fluid mixing valve in accordance with claim 12 in which said pair of side walls of said U-shaped member are joined along their length by a pair of spaced-apart cross walls defining a cam follower slot therebetween.

14. A fluid mixing valve adapted to be actuated by a handle, said valve comprising:

a valve body, said valve body defining therein (a) a mixing chamber, (b) an outlet passage communicating between said mixing chamber and the exterior of said valve body, (c) two inlet passages, each inlet passage communicating with the exterior of said valve body, and (d) a pair of valve seats spaced apart in parallel planes, each seat defining an inlet port to said mixing chamber for one of said inlet passages;

a pair of spaced-apart valve members, each valve member disposed against and adapted to slide relative to one of said seats in two mutually perpendicular directions in a plane of movement extending parallel to said seats, each valve member defining an orifice therethrough and each valve member being movable so that its associated orifice can be moved into and out of alignment with one of said inlet ports; and means actuatable by a handle for restraining said valve members against pivoting movement in said mixing chamber relative to said inlet ports and for moving said valve members together in said two mutually perpendicular directions.

15. A fluid mixing valve adapted to be actuated by a handle, said valve comprising:

a valve body, said valve body defining therein (a) a mixing chamber, (b) an outlet passage communicating between said mixing chamber and the exterior of said valve body, (c) two inlet passages, each inlet passage communicating with the exterior of said valve body, and (d) a pair of valve seats spaced apart in parallel planes, each seat defining an inlet port to said mixing chamber for one of said inlet passages;

a pair of spaced-apart valve members, each said valve member including a plate portion disposed against and adapted to slide relative to one of said seats in two mutually perpendicular directions in a plane of movement extending parallel to said seats, each valve member plate portion defining an orifice therethrough disposed so as to be movable into and out of registration with one of said inlet ports in both of said mutually perpendicular directions, said valve member plate portions being connected together to provide at least one connecting wall defining at least one cam follower extending generally perpendicular to said plate portions;

at least one of said valve member orifices or one of said inlet ports being offset in one of said mutually perpendicular directions so that when one valve member orifice and one inlet port are in maximum registration, the other valve member orifice and the other inlet port are in minimum registration; and a stem having a camming portion for engaging said cam follower, said stem being guided by the valve body for angular movement about the stem axis and for rectilinear movement along the axis, said stem being actuatable by a handle for moving said valve members together in said two mutually perpendicular directions without rotating the valve members relative to said seats.

16. The fluid mixing valve in accordance with claim 15, in which said stem supports said plate portions and connecting wall in said mixing chamber, in which said camming portion is a camming shaft offset from and parallel to the stem axis, and in which said cam follower is a cam follower slot, said camming shaft being received in said cam follower slot whereby movement of said stem angularly and axially causes movement of said plate portions in each of said mutually perpendicular directions, respectively.

17. A fluid mixing valve adapted to be actuated by a handle, said valve comprising:

a valve body, said valve body defining therein (a) a mixing chamber, (b) an outlet passage communicating between said mixing chamber and the exterior of said valve body, (c) two inlet passages, each inlet passage communicating with the exterior of said valve body, and (d) an upstanding post projecting into said mixing chamber, each said inlet passage being at least partially defined in said post, said post defining a pair of valve seats spaced apart in parallel planes, each seat defining an inlet port to said mixing chamber for one of said inlet passages;

a pair of spaced-apart valve members, each valve member disposed against and adapted to slide relative to one of said seats in two mutually perpendicular directions in a plane of movement extending parallel to said seats, each valve member having an orifice cooperable with one of said inlet ports and movable into and out of registration with one of said inlet ports in both of said mutually perpendicular directions, said movement of both said valve members thus varying the relative and combined volumes of flow fluid through said inlet ports; and means actuatable by a handle for moving said valve members together in said two mutually perpendicular directions without rotating the valve members relative to said inlet ports.

18. The fluid mixing valve in accordance with claim 17 in which said post has two oppositely facing planar surfaces lying in spaced-apart parallel planes and in which said valve seats are provided in said planar surfaces.

19. The fluid mixing valve in accordance with claim 18 including a generally U-shaped cage having downwardly depending opposed side walls defining said valve members and adapted to slidably engage said post.

20. The fluid mixing valve in accordance with claim 19 in which said cage defines a cam follower slot and in which said means for moving said valve members includes a stem with a camming shaft slidably received in said cam follower slot.

* * * * *